United States Patent
Hutchinson et al.

(10) Patent No.: US 10,841,310 B2
(45) Date of Patent: Nov. 17, 2020

(54) METHOD FOR ACCESSING DATA OR A SERVICE FROM A FIRST USER DEVICE AND CORRESPONDING SECOND USER DEVICE, SERVER AND SYSTEM

(71) Applicant: Gemalto, Inc., Austin, TX (US)

(72) Inventors: Michael Hutchinson, Austin, TX (US); Asad Ali, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 269 days.

(21) Appl. No.: 16/155,393

(22) Filed: Oct. 9, 2018

(65) Prior Publication Data

US 2020/0112564 A1    Apr. 9, 2020

(51) Int. Cl.
| | |
|---|---|
| H04L 29/06 | (2006.01) |
| H04L 29/08 | (2006.01) |
| H04W 4/02 | (2018.01) |
| H04W 12/00 | (2009.01) |
| H04W 12/08 | (2009.01) |
| H04W 4/029 | (2018.01) |

(52) U.S. Cl.
CPC .............. *H04L 63/10* (2013.01); *H04L 67/24* (2013.01); *H04W 4/023* (2013.01); *H04W 12/08* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,360,248 B1 | 4/2008 | Kanevsky et al. | |
| 2006/0014532 A1* | 1/2006 | Seligmann | G06F 21/6218 |
| | | | 455/420 |

(Continued)

FOREIGN PATENT DOCUMENTS

EP    3 280 113 A1    2/2018

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 16, 2019, in corresponding International Application No. PCT/EP2019/076376. (23 pages).

*Primary Examiner* — Joseph P Hirl
*Assistant Examiner* — Hassan Saadoun
(74) *Attorney, Agent, or Firm* — Buchanan Ingersoll & Rooney PC

(57) ABSTRACT

A method provides access to data or a service from a first device relating to a first user. A set of identifiers relating each to a second device is predefined. Each second device is related to a second user. A server receives, from the first device, a request for accessing the data or service from a current location relating to the first user. The server sends, to each selected second device, a request to determine whether the first user is locally present. Each selected second device requests, from to the second device user, whether the first user is locally present. Each selected second device gets, from the second user, a presence response and sends, to the server, the presence response. The server verifies whether the received presence response includes a predefined positive presence response. If yes, the server authorizes the first device to access the data or service.

10 Claims, 2 Drawing Sheets

(56) References Cited

U.S. PATENT DOCUMENTS

| | | |
|---|---|---|
| 2014/0157381 A1 | 6/2014 | Disraeli |
| 2016/0269385 A1* | 9/2016 | Siddiqui |
| 2019/0057373 A1* | 2/2019 | Van Veelen ........ G06Q 20/3224 |
| 2020/0184047 A1* | 6/2020 | Thayer .................. H04W 4/021 |

* cited by examiner

METHOD FOR ACCESSING DATA OR A SERVICE FROM A FIRST USER DEVICE AND CORRESPONDING SECOND USER DEVICE, SERVER AND SYSTEM

FIELD OF THE INVENTION

The invention relates generally to a method for accessing data or a service(s) from a first device relating to a first user.

Furthermore, the invention pertains to a second device for accessing data or a service(s) from a first device relating to a first user.

The present invention is notably applicable to a mobile radio-communication field in which the first user device and/or the second user device(s) include(s) a mobile terminal(s), like e.g., a mobile (tele)phone(s).

Moreover, the invention also relates to a server for accessing data or a service(s) from a first device relating to a first user.

Finally, the invention concerns a system for accessing data or a service(s) from a first device relating to a first user. The system includes a first user device, one or several second user devices and a server.

STATE OF THE ART

As known per se, a current (geographical) location of a user terminal may be retrieved from a sensor, like e.g., a Global Positioning System (or GPS) receiver. Such a current user terminal location may be modified to fool a (computer) system, such as an authorization, an authentication, a data protection or an access management system, so that the user is somewhere else than s/he actually is.

However, when the system is used for controlling, based on the current user terminal location, access to data or a service(s) (or an application(s)), the system authorizes unduly access to the concerned data or service(s).

There is a need of a solution while allowing to access, in a secure manner, the current geographical location of a terminal user to be tracked.

SUMMARY OF THE INVENTION

The invention proposes a solution for satisfying the just herein above specified need by providing a method for accessing data or at least one service from a first device relating to a first user.

According to the invention, a set of at least one identifier relating each to a second device is predefined. Each of the at least one second device is related to a second user. Each second device identifier allows accessing the concerned second device. The method comprises. a) Receiving, by a server, from the first device, a request for accessing the data or the at least one service from a current location relating to the first user. b) Sending, from the server, to at least one selected second device, a request to determine whether the first user is or is not locally present. The at least one selected second device is identified within the second device identifier set. c) Requesting, from each of the at least one selected second device to the second device user, whether the first user is or is not locally present, as a presence request. d) Getting, from the second user to each of the at least one selected second device, a presence response to the presence request. e) Sending, from each of the at least one selected second device to the server, the presence response. f) Verifying, by the server, whether the received at least one presence response does or does not include a predefined positive presence response. And g) authorizing, by the server, only if at least one of the received at least one presence response includes the positive presence response, the first device to access the data or the at least one service.

The principle of the invention consists in involving, to locate a first (or primary) user who uses a first (or primary) device, a second (or alternate) user(s) who use(s) an identified and selected second (or alternate) device and who may be geographically close to the tracked first user.

The second (device) user(s) is(are) involved from or through a server that manages access to data and/or a service(s) that is(are) requested to be accessed from the first (device) user.

The involved second user(s), as a friend(s) or a colleague(s) of the first user, allow(s) ensuring, approving or confirming a local presence of the tracked first user.

To involve the second user(s), the server accesses a corresponding second device identifier set that has been defined previously by the first user, an operator of the server and/or on its behalf. The set of one or several second device identifiers is used for locating geographically the first device user. The server selects automatically, i.e. based on one or several selection criteria at the server side and/or possibly by involving the first user, at least part of the second device(s) that is(are) identified in the second device identifier set. Then, the server requests (or queries), through the selected second device(s), to each of the associated second user(s) whether the first user is (or is not) close to the second user or locally present, as an involvement request.

Each selected second device asks its user whether the first user is (or is not) locally present, as a presence request. Each thus involved second user may provide the associated (selected) second device with a corresponding answer, as a presence response to the presence request.

Then, the server gets each presence response that originates from the selected second device associated with an involved second user.

Once the server has received the presence response(s), the server compares each presence response to a predefined expected positive presence response, such as "Yes, the first user is locally present" or "Yes". If one or several (received) presence responses match(es) the positive presence response, then the server authorizes the first user to access the concerned (requested) data and/or service(s). Otherwise, i.e. if no (received) presence response matches the positive presence response, the server forbids the first user to access the concerned data and/or service(s).

The invention solution allows thus locating securely a first user by adding a human factor, i.e. involving one or several second device users, to confirm a presence of the first user at a place in which at least part of the involved second user(s) is(are) also currently situated, when applicable.

The invention solution is simple and quick to use for each involved second user who does only have to approve or confirm a local presence of the first user that the second user verifies, i.e. localizes or may see in her/his surrounding environment.

The invention solution may be transparent to the first user since s/he may not be involved while being securely localized by a second user(s) who vouch(es) for the first user by approving or confirming the first user (co)location.

Thus, the invention solution allows a first user to access data and/or a service(s) managed by or through the server while locating securely her/him without needing to authenticate personally to the server.

According to an additional aspect, the invention is a server for accessing data or at least one service from a first device relating to a first user.

According to the invention, a set of at least one identifier relating each to a second device is predefined. Each of the at least one second device is related to a second user. Each second device identifier allows accessing the concerned second device. The server is configured to receive, from the first device, a request for accessing the data or the at least one service from a current location relating to the first user. The server is configured to send, to at least one selected second device, a request to determine whether the first user is or is not locally present. The at least one selected second device is identified within the second device identifier set. The server is configured to receive, from the at least one selected second device, at least one presence response. The server is configured to verify whether the received at least one presence response does or does not include a predefined positive presence response. And the server is configured to authorize, only if at least one of the received at least one presence response includes the positive presence response, the first device to access the data or the at least one service.

A service provider (or another third party on its behalf) that operates the server thus delegates a verification of a current first user location to a second user(s) who may be locally co-present and provide(s), when co-present, her/his location confirmation/approval. Besides a current first user location factor, the server may further need a first user authentication factor by e.g., accessing some reference first user credentials or the like, such as a reference password, to be compared to first user credentials submitted by the first user, in order to further authenticate the first user.

The server may be local or remote.

According to a further aspect, the invention is a second device for accessing data or at least one service from a first device relating to a first user.

According to the invention, the second device is configured to receive, from a server, a request to determine whether the first user is or is not locally present. The second device is configured to request, to the second device user, whether the first user is or is not locally present, as a presence request. The second device is configured to get, from the second device user, a presence response to the presence request. And the second device is configured to send, to the server, the presence response.

The second device may include a terminal, like e.g., a mobile phone or a Personal Computer (or PC), a Secure Element (or SE) and/or any kind of communicating and computing device.

Within the present description, an SE is a smart object that includes a chip(s) that protect(s), as a tamper resistant component(s), access to stored data and that is intended to communicate data with a device(s), like e.g., an SE host device, such as a (mobile) phone and/or a server.

According to still a further aspect, the invention is a system for accessing data or at least one service from a first device relating to a first user.

According to the invention, a set of at least one identifier relating each to a second device is predefined. Each of the at least one second device is related to a second user. Each second device identifier allows accessing the concerned second device. The system comprises the first device, at least one selected second device and a server. The first device is configured to send to a server a request for accessing the data or the at least one service from a current location relating to the first user. The server is configured to send, to at least one selected second device, a request to determine whether the first user is or is not locally present, the at least one selected second device being identified within the second device identifier set. Each of at least one selected second device is configured to request, to the second device user, whether the first user is or is not locally present, as a presence request, and to get, from the second device user, a presence response to the presence request. And each of at least one selected second device is configured to send, to the server, the presence response. The server is configured to receive, from the at least one selected second device, the at least one presence response and to verify whether the received at least one presence response does or does not include a predefined positive presence response. And the server is configured to authorize, only if at least one of the received at least one presence response includes the positive presence response, the first device to access the data or the at least one service.

The system may include a first Terminal Equipment (or TE) including a first mobile phone, as a first device, one or several second TEs, as a second device(s), including each a second mobile phone, and a server.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention method for accessing data or a service(s) from a first user device is implemented by a first TE, two second TEs, as standalone devices, and a server. In other words, no TE cooperates with any other device, like e.g., an SE, so as to carry out the function(s) that is(are) described infra.

According to another embodiment (not represented), the invention method for accessing data or a service(s) from a first user device is implemented by a server, a first TE and one or several second TEs in which one or several first and/or second TEs comprise(s) or is coupled (or connected) each to an SE. According to such an embodiment, the SE(s), as a first and/or second device(s) for accessing data or a service(s) from a first user device, is(are) adapted to perform the functions that are carried out by the first and/or a second TE respectively and that are described infra by adding a secure data storage and a secure data processing in the concerned SE(s).

Each SE may include an incorporated chip, like e.g., an embedded Universal Integrated Circuit Card (or eUICC) or an integrated Universal Integrated Circuit Card (or iUICC), within a terminal, as an SE host device, or a chip that is coupled to the terminal, as an SE host device, and included in a smart card (or another medium). The chip may therefore be fixed to or removable from its host device.

As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device, as a first or second device for accessing data or a service(s) from a first user device.

The invention does not impose any constraint as to a kind of the SE type.

Naturally, the herein below described embodiment is only for exemplifying purposes and is not considered to reduce the scope of the invention.

Figure 1:
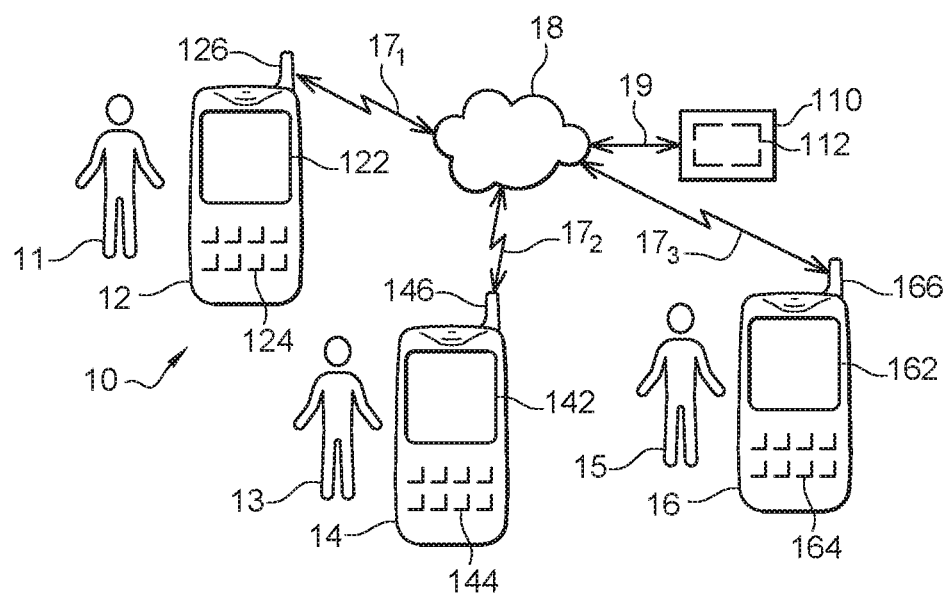
FIG. 1 illustrates a simplified diagram of an embodiment of a system comprising a primary TE, two alternate TEs and a server, the server being requested from the primary TE to access data or a service(s), each alternate TE being configured to get a primary TE user location request, request the alternate TE user whether the primary TE user is co-present, get and send a corresponding presence response to the server, and the server being adapted to get the alternate TE user presence response(s), check whether this(the) latter include(s) an expected positive presence response(s) and, only in the affirmative, authorize the primary TE user to access the data or service(s), according to the invention.

FIG. 1 shows schematically a system 10 including a first (mobile) TE 12, as a first device, a second (mobile) TE 14, as a second device, a third (mobile) TE 16, as another second device, and a SerVer (or SV) 110.

It is assumed that the first TE 12 is used by a first user 11, the second TE 14 is used by a second user 13 and the third TE 16 is used by a third user 15. The first 11, second 13 and third 15 users are separate from one to another.

Each second user 13 or 15 is likely to vouch for the first user 11 that s/he is locally co-present at the moment the concerned second user 13 or 15 is questioned or consulted.

It is also assumed that the first user 11 desires or requests to access, from the first TE 12, data or a service(s) managed by or through the SV 110.

The SV 110 is accessible, Over-The-Air (or OTA), Over-The-Internet (or OTI) and/or Over The Cloud (or OTC), over a communication network(s) 18, like e.g., a mobile radio-communication network(s), by a set of connected devices, like e.g., the first 12, the second 14 and/or the third 16 TE.

The mobile radio-communication network(s) may include a Global System for Mobile Communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA) and/or a Long Term Evolution (or LTE) type network(s).

Such a mobile radio-communication network set is not exhaustive but only for exemplifying purposes.

Additionally or alternately, the communication network(s) may include a WLAN (acronym for "Wireless Local Area Network") or an Internet or Intranet type network, that may be accessed through a Short Range (or SR) radio-communication link(s), like e.g., a Bluetooth, Bluetooth Low Energy (or BLE), Wi-Fi, ZigBee, Near Field Communication (or NFC) type link(s).

Each first 12 or second 14 or 16 TE includes e.g., a (mobile) phone.

Instead of a phone, the first 12 or second 14 or 16 TE may include a PC, a desktop computer, a laptop computer, a media-player, a game console, a tablet, a netbook, a smart watch, a smart jewel (or jewelry), a handset and/or a Personal Digital Assistance (or PDA) that incorporates or cooperates with a baseband (radio) processor(s).

Each phone may include or be connected or coupled to one or several chips (not represented).

The chip(s) is(are) incorporated, possibly in a removable manner, within a Printed Circuit Board (or PCB) of the phone, as a chip host device.

The chip(s) may also incorporate at least part of the phone component(s), like e.g., a baseband processor, an application processor(s) and/or other electronic component(s).

In a particular embodiment, the chip(s) include(s) a Trusted Execution Environment (or TEE), as a secure area of a phone (or host device) processor and a secured runtime environment.

Alternately, the chip(s) may be included in or removable from an SE.

Each SE belongs preferably to the concerned TE user, as a subscriber to a wireless service(s).

Each SE includes one or several chip(s) comprising each a (micro)processor(s) (and/or a (micro)controller(s)), as data processing means (not represented), a memory(ies), as data storing means (not represented), and one or several Input/Output (or I/O) interfaces (not represented) that are internally all connected, through an internal bidirectional data bus, to each other.

Each (SE) chip I/O interface allows communicating data from the internal SE chip(s) to the chip exterior and conversely.

An (SE) chip memory stores an Operating System (or OS).

The (or another) chip memory may store an International Mobile Equipment Identity (or NEI), a Mobile Subscriber Integrated Services Digital Network number (or MSISDN), an Internet Protocol (or IP) address, an International Mobile Subscriber Identity (or IMSI) and/or an email address(es), as an identifier(s) relating to the concerned SE or TE (or a TE accessory).

The (chip) medium may include, instead of the TE 12, 14 or 16, a watch, a headset or the like, as an accessory of the concerned TE 12, 14 or 16 that is able to exchange with the TE 12, 14 or 16. The medium may include any other wearable device, like e.g., a camera, a clothing, a jewel (or jewelry) of the concerned TE user or anything that may accommodate or integrate the SE chip(s), which the first or second TE user 11, 13 or 15 wears or accesses.

Instead of a phone, a user terminal may be any other device including means for processing data, comprising or being connected to Long Range (or LR) and/or SR Radio-Frequency (or RF) communication means for exchanging data with outside, and comprising or being connected to means for storing data.

Each phone 12, 14 or 16 includes one or several (micro) processors (and/or a (micro)controller(s)) (not represented), as means for processing data, comprising and/or being connected to one or several memories, as means for storing data, comprising or being connected to means for interfacing with the concerned phone user, as Man Machine Interface (or MMI) and comprising or being connected to an antenna(s) 126, 146 or 166 for wirelessly exchanging data with outside.

Each phone antenna 126, 146 or 166 allows the first or second phone 12, 14 or 16 to communicate, preferably through an RF link(s) $17_1$, $17_2$ or $17_3$, as a wireless link(s), via the communication network(s), data with the SV 110.

The RF may be fixed at several hundreds of MHz, e.g., around 850, 900, 1800, 1900 and/or 2100 MHz, as an LR type RF.

Alternately or additionally to the LR type RF, each phone 12, 14 or 16 is connected to or include Contact-Less (or CL)

communication means for exchanging data with outside, like e.g., via a Wi-Fi-Hotspot (not represented), as a Network Access Point (or NAP), with the SV 110.

Within the present description, the adjective "CL" denotes notably that the communication means communicates via one or several SR type RF links.

The SR type RF link(s) may be related to any CL technology that allows each second phone 14 or 16 to exchange locally data, through a CL type link(s) (not represented), with the SV 110 or at least the first phone 12 (and possibly with any other second phone set member 16 or 14). The SR RF may be related to e.g., an NFC, a Wi-Fi, a Bluetooth and/or a BLE type communication technology(ies) or the like, as a non-mobile (radio) communication channel(s).

Alternatively, instead of a wireless and/or CL link(s), each second phone 14 or 16 is connected, through a wire(s) or a cable(s) (not represented), to the first phone 12 and/or the SV 110.

The phone memories may include one or several EEPROMs (acronym for "Electrically Erasable Programmable Read-Only Memory"), one or several ROMs (acronym for "Read Only Memory"), one or several Flash memories, and/or any other memories of different types, like one or several RAMs (acronym for "Random Access Memory").

Each phone MMI may include a display screen(s) 122, 142 or 162, a keyboard(s) 124, 144 or 164, a loudspeaker(s) (not represented) and/or a camera(s) (not represented).

Each second phone MMI allows the concerned second phone user 13 or 15 to interact with the concerned second phone 14 or 16 respectively.

Each second phone MMI may be used for presenting information to its user 13 or 15, like e.g., a message for prompting the user to enter or provide data, as a presence request, such as "Is first user last name/first name (or surname) also locally present?".

Each second phone MMI is used for getting data entered or provided by the user, such as "Yes" or "No", as a presence response to the presence request. The presence response may be defined, written, clicked and/or selected by the concerned second user 13 or 15.

The first phone 12 may store a first and/or last name(s) relating to the first user 11, as a first user identifier(s), an IMEI1, a MSISDN1, an IP address1, an IMSI1 and/or an email address(es)1, as a first phone 12 identifier(s).

The first phone 12 may store a first and/or last name(s) relating to the second user 13, as a second user identifier(s), and/or an IMEI2, an MSISDN2, an IP address2, an IMSI2 and/or an email address(es)2 relating to each second phone 14 or 16. Thus, each second device 14 or 16 is identified and accessible from any other device, such as the SV 110, that has received, from the first phone 12 and/or another first user device(s), the second device identifier set or the first user location data set.

The first phone 12 is able to request, optionally under the first user 11 control, from or through the SV 110, access to data or one or several services from a current first phone 12 location.

The first user 11 may define, by using e.g., her/his contact(s), such as her/his phonebook, a set of an identifier(s) relating each to a second device to be possibly involved for locating the first user 11 in association with a last name and/or a first name relating to the associated second user.

The first user 11 may have created or defined a set of one or several IMSIs or the like, as an identifier(s) relating each to a second phone 14 or 16 relating to a corresponding second user 13 or 15 who may be involved, in association with the corresponding second user 13 or 15 identifier(s), such as a last name and/or a first name of the second user 13 or 15. The first user 11 may have provided one or several entities, such as the first phone 12, the SV 110 and/or another server accessible from the SV 110, with the second phone identifier(s) preferably in association each with a corresponding second user identifier(s), as a set of data for a first user location.

Such a first user location data set includes preferably a second phone 14 identifier(s) in association with a corresponding second user 13 identifier and a third phone 16 identifier(s) in association with a corresponding third user 15 identifier.

The first phone 12 memory(ies) may store the second phone (or device) identifier(s) preferably in association each with a corresponding second user identifier(s), as the first user location data set.

The first user 11 may further select, in the first user location data set, either a corresponding (sub)set of the second device identifier(s) or a corresponding (sub)set of the last name\first name relating to the corresponding second device user(s), to be actually used for locating the first user 11.

Each second phone identifier allows identifying uniquely the concerned (associated) second phone 14 or 16. Each second phone identifier allows accessing, through the associated second phone 14 or 16, the concerned corresponding second user 13 or 15 respectively, so as to involve her/him to locate the first user 11.

Each phone 12, 14 or 16 may include one or several sensors, such as a location sensor(s), like e.g., a GPS receiver(s). The location sensor(s) allow(s) locating geographically, based on corresponding issued location data, the concerned phone 12, 14 or 16 and its associated first 11, second 13 or third 15 user respectively.

Each phone 12, 14 (or 16) may be configured to generate sensor data, in a simultaneous manner, with another corresponding SR-RF coupled phone 14 (or 16) or 12, e.g. by moving them together, respectively. The concerned coupled first and second phones 12 and 14 (or 16) coordinate, based on an exchange initiated by the second phone 14 (or 16), a common starting sensor capture time T1 and a common stopping sensor capture time T2, to generate and record their respective T1, T2 and sensor data. After having transmitted, from the second phone 14 or 16 to the first phone 12, a command, several known techniques, like e.g., a light, a ultrasound and/or a radar technology(ies), may be used for transmitting the command and for receiving, in a few e.g., microseconds after the command transmission, a corresponding command receipt from the first phone 12 to the second phone 14 or 16.

Each phone 12, 14 or 16 includes preferably a data signature process to be used before sending data, like e.g., a presence response that may be accompanied with further data, such as sensor data, so as to prove an origin of (sent) data originating from the concerned phone 12, 14 or 16. To sign data to be sent, the phone 12, 14 or 16 uses a predetermined signature generation algorithm, like e.g., a Rivest Shamir Adleman (or RSA) type signature algorithm, as a Public Key Infrastructure (or PKI) algorithm, and/or a Message Authentication Code (or MAC) type algorithm as a non-PKI algorithm, and a predetermined signature key that are both stored in a phone memory (and/or a memory relating to either an SE hosted by or coupled to the phone or a phone accessory). The signature key is preferably related to the concerned phone 12, 14 or 16, as a private key. The interlocutor or addressee of the thus signed data, namely another device (like e.g., another phone) or the SV 110, is able to verify a corresponding signed presence response by using a predetermined signature verification algorithm(s), like e.g., an RSA type signature verification algorithm, and/or a MAC type signature verification algorithm, and a corresponding predetermined signature verification key that are both stored at the phone addressee side. The signature verification key is preferably a public key that relates to the concerned phone 12, 14 or 16 and that has been generated from the associated phone 12, 14 or 16 private key. If the sent data signature, like e.g., the RSA signature, is successfully verified, then the corresponding receiver of the sent data knows that the sent data originates from the sender and/or if the sent data integrity, like e.g., a MAC, is successfully verified, then the sent data has not been altered. Otherwise, i.e. if the verification of the sent data signature and/or the verification of the sent data integrity, like e.g., the RSA signature and/or the MAC, fail(s), something is not right, i.e. the sent data has not been issued by the sender and/or the sent data has been altered during its transmission.

Each second phone 14 or 16 stores preferably an IMEI1, an MSISDN1, an IP address1, an IMSI1 and/or an email address(es)1 relating to the concerned first phone 12, as an identifier(s) relating to the concerned first phone 12 to be located and addressed during a process for ensuring, by the second user(s) 13 and/or 15, a current location relating to the first user 11. The first phone identifier allows identifying uniquely the first phone 12. The first phone identifier allows accessing, through the associated second phone 14 or 16, the concerned corresponding second user 13 or 15 respectively, so as to involve her/him to locate the first user 11.

Alternately, instead of storing the first phone 12 identifier(s), each second 14 or 16 phone is arranged to receive, from the SV 110, the first phone 12 identifier(s) along with a request to determine whether the first user is or is not locally present, as an involvement request.

Each first 12 or second 14 or 16 phone is preferably used for accessing, directly or indirectly, i.e. through (an)other phone(s), the SV 110, so as to locate the first user 11. The first phone 12 supports preferably a corresponding invention application (or software) (for accessing data and/or a service(s) from the first user device) (not represented).

Each second phone 14 or 16 supports preferably a corresponding invention application (or software) (for accessing data and/or a service(s) from a first user device) (not represented).

Each second phone 14 or 16 may be arranged to receive, from a preferably registered first device or server, a request to determine whether a first (device) user is or is not locally present, a request for locating a first device user who the second phone user is likely to locate or the like, as an involvement request.

Alternately, each second phone 14 or 16 is arranged to trigger an execution of the invention application supported by the concerned second phone 14 or 16 or a device, such as an SE, incorporated in or coupled to the concerned second phone 14 or 16, to request the corresponding second phone user 13 or 15 whether an identified first device user is or is not locally present.

Each of the second phone 14 or 16 is preferably configured to request, to the (concerned) second device user 13 or 15 respectively, whether the first user 11 is or is not locally present, as a presence request.

Such a presence request that is addressed to the concerned second device user allows delegating a location authentication relating to the first user 11 to another person or people who preferably know and are able to locate the first device user.

Each of the second phone 14 or 16 is adapted to get, from the (concerned) second device user 13 or 15, a corresponding answer or presence response to the presence request.

Each of the selected second phone 14 or 16 is further adapted to send directly or indirectly, namely through the first phone 12 or another identified second phone, to the SV 110, the presence response.

The SV 110 is connected, over a (bi-directional) wireless and/or wire link(s) 19, through the communication network(s) 18, to the first 12 and second 14, 16 phones.

The SV 110 is identified by a Uniform Resource Identifier (or URI), like e.g., an Uniform Resource Locator (or URL), an IP address and/or the like, as an identifier(s) relating to the SV 110. The SV 110 identifier(s) may be stored at the first phone 12 side (e.g., in a first phone 12 memory and/or a SE memory incorporated or coupled to the first phone 12).

The SV 110 may be operated by a Mobile Network Operator (or MNO), a Mobile Virtual Network Operator (or MVNO), a bank operator, a service provider or on its behalf.

The SV 110 is hosted by a computer including data processing means, like e.g., a processor(s) (not represented), and one or several I/O interfaces for exchanging data with outside.

The SV 110 (processor) is used for running an invention application (or software) (for accessing data or a service(s) from a first device relating to a first user) (not represented).

The SV 110 plays preferably a role of a delegator of a location of a preferably registered primary (or first) device user to one or several other users using each an alternate (or second) device.

The SV 110 includes (or is connected to) a server memory(ies) 112, as data storing means, that stores preferably a database that includes data relating to a plurality of first user accounts.

The SV 110 is able to access the database.

The database comprises preferably a set of first user accounts and, in association with each first user account, one or several identifiers relating to the concerned first user, and one or several identifiers relating to a corresponding first device and, as first user location data set, one or several identifiers relating each to a corresponding second device and, for each second device, one or several identifiers relating to the concerned second user. Furthermore, the first user location data set may be associated, for at least a part of the identified second user(s), with, for each concerned second user identifier, a corresponding trust level value allocated to the identified second user and/or a corresponding last known location relating to the identified second user.

The data relating to the first user accounts may include, for one or several identifiers relating to each recorded first user, a public key relating to the first device that may be used for verifying a corresponding signature (issued by the first device).

Each first user account may be associated with an IMSI(s)1, a URI(s)1, a URL(s)1, an email address(es)1, an IP address(es)1, an MSISDN(s)1 and/or the like, as one or several identifiers relating to the first device.

The first device identifier allows identifying uniquely a corresponding first device to be located geographically.

The SV 110 is preferably configured to receive a request for accessing data or one or several services from a current location relating to the first device user. Such an access request may originate from a (registered) first (user) device.

The SV 110 stores in the server memory(ies) 112 or accesses a set of one or more identifiers relating, each, to a second device. The second device identifier set is predefined e.g., by or through the first user 11 and/or the SV 110. Each second device is related to a corresponding second user. The second device identifier set includes, for each second device, an IMEI2, an MSISDN2, an IP address2, an IMSI2 and/or an email address(es)2, as one or several identifiers relating to the concerned second device. Each second device identifier allows accessing the concerned second device. Each second device that may be involved, after a possible selection, is identified in a second device identifier set with a second device identifier(s), such as an IMSI2 or IMSI3.

The SV 110 is preferably used in cooperation with a part or all of a set of (client) second device identifiers, as selected second device identifiers, so as to locate, through the corresponding second device users, the first (device) user. The second device identifier set is registered preferably at the SV 110 side and/or at the first device side. Instead of or additionally to the first user 11, the SV 110 may automatically select, based on one or several predefined selection criteria to be satisfied, a (sub)set of the second device identifiers to be actually used for locating the first user 11.

The selection criteria may include one or several elements of a group comprising:
- a last known (geographical) location relating to the first device user to be close to;
- one or several given second user identifiers to be selected;
- one or several given second device identifiers to be selected;
- a predefined trust threshold value to be equal to or exceeded in association with one or several second device identifiers relating to the concerned second user(s) to be selected; and/or
- a last known (geographical) location relating to each concerned second user with respect to a given assumed (geographical) location relating to the first device user to be close to.

The first user location data set and possible (sub)set may be registered and accessible at the first phone 12 side and/or at the SV 110 side.

Each first user account is associated with one or several identifiers relating each to a second device that is used by or belongs to a corresponding second (device) user. Each concerned second user may include a friend, a colleague or a person who is expected to be close to a (geographical) location allowed, for the concerned first device user, to access data or a service(s) managed by or through the SV 110. Such a location may include a work place, a secure place or the like where the first device user 11 has to be to access data or a service(s) managed by or through the SV 110.

The SV 110 may be able to receive, for each first user account (client), from the associated first device(s), one or several identifiers relating to a second device(s) that may be addressed and used for authenticating the (concerned) first user location along with a corresponding second user identifier(s).

Each second device identifier allows identifying uniquely and accessing a corresponding second device.

The SV 110 is preferably arranged to send, to one or several selected second devices, a request to determine whether an identified first user is or is not locally present, as an involvement request. To send such an involvement request allowing to involve a corresponding second user(s), the SV 110 may send one or several scripts for requesting the user to provide an answer or a presence response to the presence request. The script(s) for requesting the user to provide a presence response to the presence request is(are) intended to be executed by each addressed (selected) second device.

The SV 110 is adapted to receive, from the selected second device(s), one or several presence responses.

According to an essential invention feature, the SV 110 is configured to check whether the received presence response(s) do(es) or do(es) not include a predefined positive presence response, such as "yes" or "the first user is locally present".

If the received presence response(s) includes a predefined positive presence response, then the SV 110 may be further arranged to calculate or determine a distance that separates the first device from each second device that sends or has sent the positive presence response.

To determine a distance that separates the first device from each second device, the SV 110 uses data, like e.g., a current location relating to the first device and a current location relating to the concerned second device, that is received by the SV 110 from the first device and/or the concerned second device along with the corresponding associated presence response.

Optionally, the SV 110 is adapted to check whether the received presence response(s) do(es) or do(es) not satisfy one or several conditions. The condition(s) to be satisfied may include one or several elements of a group comprising:
- if the received presence response(s) include(s) a current location relating to the corresponding second device(s) and/or a current location relating to the first device that match(es) a user location that is allowed to access the data or service(s);
- if the received presence response(s) include(s) a corresponding valid signature originating from the corresponding second device(s);
- if the received presence response include(s) a corresponding valid signature originating from the concerned first device; and
- if one or several of the calculated (or determined) distance (s) is less than or equal to a predefined threshold, like e.g., a few meters.

The SV 110 (processor) may execute one or several security functions, in order to protect access to information managed through or by the SV 110.

The security functions include preferably a data encryption process by using a public key relating to each second device to be addressed further to a possible selection or a symmetric key shared with a receiver of resulting encrypted data, so that the second device accesses the resulting encrypted data (through the corresponding decrypted data (in plain text)) that is sent by the SV 110.

The security functions include preferably a data signature verification by using a public key related to each sender of data that is received, so as to prove that an originator of sent (and received) data is a registered first user device or a corresponding registered second user device.

The security functions include preferably a data decryption process by using a private key relating to the SV 110 or a symmetric key shared with a sender of encrypted data, so as to access encrypted data (through the corresponding decrypted data (in plain text)) that is received by the SV 110.

The security functions include preferably a challenge generation process by using, e.g., a random generator or the like, to issue a presence challenge each time the SV 110 sends to one or several (selected) second devices an involvement request. The SV 110 shall receive from each concerned selected second device a corresponding expected (presence)

challenge response in response to the (presence) challenge. The security functions include a corresponding (presence) challenge response verification process. The use of an issued presence challenge allows avoiding a replay attack by verifying that a received challenge response matches the expected challenge response.

The SV 110 is arranged to check whether each of the received presence response(s) does or does not include a predetermined positive presence response.

The SV 110 is arranged to authorize, only if at least a part (or a threshold) of the received presence response(s) includes the positive presence response, the concerned first device to access the data and/or the service(s).

Such a received presence response part (or threshold) is preferably configurable by the operator of the SV 110, on its behalf and/or the concerned first user, so as to adapt to data and/or a service(s) that may be accessed by or through the SV 110.

The SV 110 is arranged to store (or let store) in the server memory 112 the first user location verification result, i.e. either a first user access authorization or refusal.

The SV 110 authorizes (when a current location of the first user has been successfully recognized or approved, in an allowed location, by one or several second users) or forbids access to the requested data and/or service(s).

Figure 2:
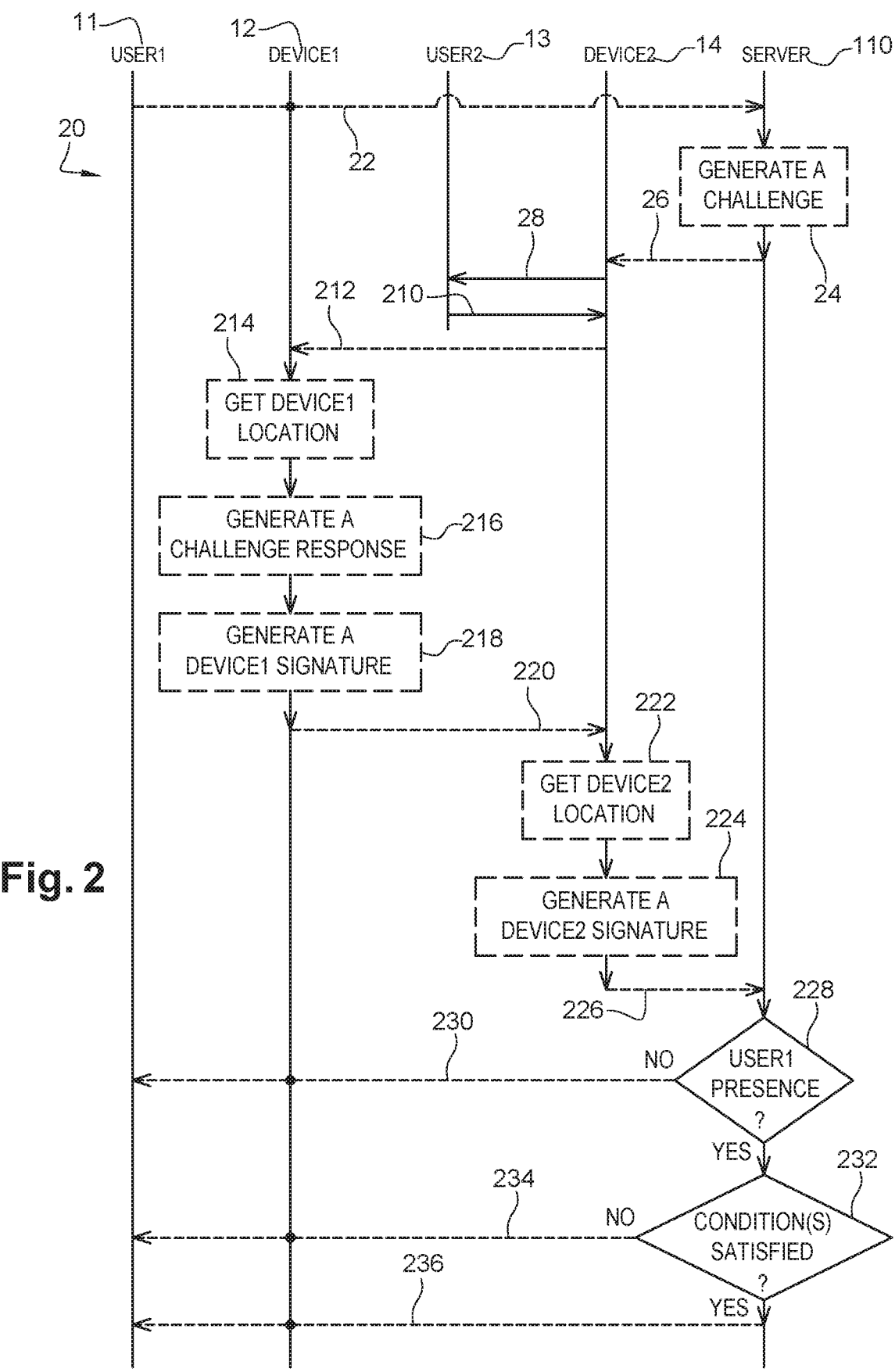
FIG. 2 represents an embodiment of a message flow between the primary user, the primary TE, one single selected alternate TE, an associated alternate TE user and the server of FIG. 1, so that, further to an approval (or refusal), by the selected alternate TE user, of a primary TE user co-location, the server authorizes (or forbids) access to the data or service(s).

FIG. 2 depicts an exemplary embodiment of a message flow 20 that involves the user 11, the first (user) phone 12, as a first user device, the (selected) second phone 14, as a second user device, the corresponding second user 13 and the SV 110.

In the described example, it is assumed that the first user 11 has launched a web browser supported by the first phone 12, to request, while identifying her/himself, to the SV 110 access to data and/or one or several services. It is further assumed that the first user 11 is registered at the SV 110 side and has two phones 14 and 16 that are registered in a second device identifier set associated with the first phone 12, so as to verify a current location relating to the first user 11. It is still further assumed that the first phone 12 and the SV 110 exchange indirectly, i.e. through a second user phone. According to an alternative (not represented), the first phone 12 and the SV 110 exchange directly, i.e. without passing through a second user phone(s) that the first user 11 desires to involve.

The first user 11 enters, by using e.g. the first phone MMI, a user first/last name(s) or an email address(es), as a first user identifier.

Alternately or additionally, the first user 11 enters), by using e.g. the first phone MMI, an MSISDN1 and/or an IMSI1 related to her/his phone 12, as a first user device identifier(s).

It is assumed that the first phone 12 exchanges with the SV 110 by using e.g., HyperText Transfer Protocol (or HTTP) or HTTP Secure (or HTTPS) type messages. However, any other data communication protocol between the first phone 12 and the SV 110 may be used alternatively, by using e.g., Short Message Service (or SMS) type messages, or additionally to the HTTP(S) type protocol.

Once the first user 11 has provided one or several first user identifiers, the first phone 12 sends, preferably under the first user 11 control, to the SV 110 a message 22 including a request for accessing data and/or a service(s) managed by or through the SV 110 including or being accompanied with the email address and/or the MSISDN1 and/or IMSI1, as the first user device identifier(s).

Such an access request message 22 originates from a current location relating to the first user 11, such as a work place allowed to access the requested data and/or service(s).

The access request message 22 includes preferably a predetermined URL relating to the SV 110, as a particular server identifier allowing to access the SV 110.

The access request message 22 may include one or several second user identifiers and/or one or several corresponding second device identifiers that the first user 11 desires to involve, so as to locate her/him.

The access request message 22 may include a current location relating to the first phone 12.

If the SV 110 receives the current first phone location, then the SV 110 verifies (not represented) whether the received current location relating to the first phone 12 does or does not match a location that is allowed to access the (requested) data and/or service(s). If the SV 110 verifies that the received current location relating to the first phone 12 does not match an allowed location, then the SV 110 denies access to the data and/or service(s) and aborts an initiated communication or transaction process. In such a latter scenario, no transaction is thus performed. Otherwise, i.e. only if the SV 110 verifies that the received current location relating to the first phone 12 matches an allowed location, the SV 110 continues an initiated transaction process, so as to locate the first user 11 by involving one or several second user devices.

The SV 110 may verify (not represented) whether the concerned identified first user 11 is or is not registered and authorized to access thus requested data and/or service(s). If the SV 110 identifies that the first user 11 is not authorized to access the service, then the SV 110 denies access to the data and/or service(s) and aborts an initiated communication or transaction process. In such a latter scenario, no transaction is thus performed. Otherwise, i.e. only if the SV 110 identifies that the first user 11 is authorized to access the data and/or service(s), the SV 110 continues an initiated transaction process, so as to locate the first user 11 by involving one or several second user devices.

The SV 110 retrieves (not represented) the second device identifier set that is associated with the registered first user 11. Once the second device identifier set is retrieved, the SV 110 may select, by using data provided from the first device 12 and/or the first user 11 and/or based on a predefined selection criteria, in the second device identifier set, the identified second phone 14, as the second device to be addressed to involve a corresponding second user 13. A selection result may be part or all of the second device identifier(s) included in the second device identifier set.

The SV 110 generates (not represented) an involvement request message including a request to determine whether the first user 11 is or is not locally present (by involving preferably the corresponding second user 13). The thus generated involvement request is personalized to the concerned identified first user 11 while using e.g., her/his first/last name(s), as a first user identifier(s). Such an involvement request is to be sent to the selected second device(s), so as to involve the corresponding second device user(s).

Instead of the involvement request message that is interpreted by an invention application supported by the addressed second device, the SV 110 may use a previously generated script for requesting to determine whether the first user 11 is or is not locally present. Such an involvement script is to be executed by a second device to be addressed. Once executed, the concerned addressed second device requests, through the second device MMI, to the second device user whether the first user 11 is or is not locally present, as a presence request.

Optionally, the SV 110 generates 24 a (presence) challenge, by using e.g., a random generation algorithm. The challenge is used preferably only once for a given communication session between the SV 110 and a second device to be involved, so as to avoid any replay attack.

The involvement request (or script) message may further include the challenge.

Optionally, prior to sending the involvement request (or script) message, the SV 110 encrypts the involvement request (or script) (by using a public key relating to the second device to be addressed or a symmetric key shared between the SV 110 and the second device to be addressed) and/or signs the involvement request (or script) message (by using a private key relating to the SV 110).

The SV 110 sends to the second phone 14, as the selected second device, an involvement request (or script) message 26 that includes the (possibly encrypted and/or signed) involvement request (or script).

The involvement request (or script) message 26 includes preferably the URL relating to the SV 110, the MSISDN2 and/or the IMSI2 relating to the second phone 14, as the second device identifier(s) included in the second device identifier set (that is registered in association with the identified first user 11 at the SV 110 side).

The involvement request (or script) message 26 may further include one or several identifiers relating to the first user 11 and/or one or several identifiers relating to the first device 12. Such an enriched involvement request (or script) message allows identifying the concerned first user 11 and/or the concerned first device 12 to be involved. The used first device identifier(s) may force the second device that is addressed with the involvement request (or script) message to use, after a second user involvement, a corresponding communication channel(s), such as an SR RF type communication channel(s), like e.g., an NFC and/or BLE channel(s), between the (addressed) second device and the concerned first device.

Once the second phone 14 has received the involvement request (or script) message, after a possible data decryption and/or a successful SV signature validation, the second phone 14 sends, preferably through the second phone MMI, to the corresponding second user 13, a presence request 28 to request to the second user 13 whether the first user 11 is or is not locally present. The presence request may include a message, such as "Is first user 11 first/last name also locally present?" that prompts the second phone user 13 to enter or provide a corresponding answer. The second user 13 is thus involved to localize the first user 11.

The second user 13 provides, preferably through the second phone MMI, the second phone 14 with a presence response 210 to the presence request 28. The presence response may include a message, such as either "Yes, the identified first user 11 is also locally present." or "No, the identified first user 11 is not also locally present.".

The second phone 14 thus gets the second user 13 presence response to the presence request, as a second user presence response.

The second phone 14 stores the second user presence response.

The second phone 14 may send, directly to the SV 110, a response message 226 that includes the second user presence response for its analysis by the SV 110. Prior to sending the response message, the second phone 14 may generate 224 a second phone signature relating to the data to be sent, as a signed second presence response. Such data to be sent includes the second user presence response and possibly a challenge response by using e.g., a challenge response generation algorithm and the challenge, as input, received, from the SV 110, in the involvement request message 26. After a second user presence response analysis and possibly (an)other condition(s) to be satisfied, such as a success of a verification of the signed second presence response, the SV 110 knows whether the first user 11 is authorized or forbidden to access the data and/or service(s).

Alternatively (instead of sending directly to the SV 110 a response message), the second phone 14 sends to the first phone 12 a request message 212 that includes a first phone location request, a first device signature request and/or a challenge response request that includes the challenge (provided originally by the SV 110) to be used.

Once the first phone 12 has received the request message 212, if the request message 212 includes a first phone location request, the first phone 12 retrieves or gets 214, preferably from one or several (local) first sensors incorporated in or coupled to the first phone 12, a first phone 12 location, as LOC1 and first sensor data.

Once the first phone 12 has received the request message 212, if the request message 212 includes a challenge response request, the first phone 12 generates 216 a challenge response by using e.g., a challenge response generation algorithm and the challenge, as input, received in the request message 212.

Once the first phone 12 has received the request message 212, if the request message 212 includes a first signature request, the first phone 12 generates 218 a first phone signature relating to data to be sent, as a signed first presence response that includes a first signature. Such data to be sent may include the first sensor data (LOC1) and/or the challenge response.

The first phone 12 sends indirectly, i.e. through the second phone 14 through which the first phone 12 has been involved, to the SV 110, a first response message 220 that includes the first presence response that is generated and possibly signed by the first phone 12.

Alternatively, the first phone 12 sends directly to the SV 110 a response message (not represented) that includes the first presence response that is generated and possibly signed by the first phone 12.

Once the second phone 14 has received the first response message 220 by using preferably an SR RF communication, the second phone 14 may retrieve or get 222, preferably from one or several (local) second sensors incorporated in or coupled to the second phone 14, a second phone 14 location, as LOC2 and second sensor data. Such a first embodiment in which the second phone 14 firstly receives locally from the first phone 12 the first response message 220 prior to adding and sending to the SV 110 a second user presence response is secure with respect to a second embodiment in which the second phone 14 firstly adds and sends to the first phone 12 a second user presence response and then receives from the first phone 12 a response message (not represented) that includes the first presence response and the second user presence response. The first embodiment allows avoiding that the second user presence response is subject to fraud, i.e. intercepted and modified, when sending the second user response.

The second phone 14 may generate (not represented), when the first phone 12 is not involved, by the SV 110, through the second phone 14, to provide a presence response, a challenge response by using e.g., a challenge response generation algorithm and the challenge, as input, received in the involvement request message 26.

Then, the second phone 14 may generate 224 a second phone signature relating to data to be sent, as a signed second presence response that includes a second signature. Such data to be sent includes the second user presence response and possibly the second sensor data (LOC2) and/or possibly the challenge response. The second signature includes a signature of the second presence response and, when the first phone 12 has previously signed its sent data, the first signature that is also signed by the second phone 14, i.e. a second phone signature of the first phone signature or the first presence response that is twice signed, namely firstly by the first phone 12 and secondly by the second phone 14.

The second phone 14 sends directly, i.e. without passing through any other second phone 16 or the first phone 12, to the SV 110 a second response message 226. The second response message 226 includes the first presence response and the second user presence response. The first presence response has been generated by the first phone 12 (and possibly signed by the first phone 12 and the second phone 14). The second user presence response includes the second user 13 presence confirmation (that involves the second user 13) and may further include the current second phone 14 location and/or a signature of the data sent by the second phone 14.

The SV 110 receives from the (selected) second phone 14 (and possibly the first phone 12) the presence response(s) including the second user presence response(s) (and possibly the first presence response).

Then, the SV 110 verifies 228 whether the received presence response(s) do(es) or do(es) not include a predetermined positive presence response, such as "yes, the first user 11 is also locally present".

In the negative, no second user 13 confirms that the first user 11 is co-located. In such a negative case, the SV 110 may send to the first phone 12 a refusal message 230 that includes a refusal to access the requested data and/or service(s).

In the affirmative, at least one of the second user 13 confirms that the first user 11 is co-located. The second user 13 uses the second phone 14, as a corresponding (associated) second device.

In such an affirmative case, the SV 110 may verify 232 whether one or several conditions to be satisfied are or are not satisfied.

The condition(s) to be satisfied may include one or several elements of a group comprising:
  if the corresponding (associated) received challenge response matches a predetermined expected challenge response;
  if the current first phone location matches or is (sufficiently) close to the corresponding (associated) current second phone location;
  if a distance that separates each of the corresponding (associated) selected second phone 14 and the first phone 12 is less than or equal to a predetermined threshold, the SV 110 having previously determined, based on data received from the first phone 12 and each of the selected second phone 14, the distance that separates each of the selected second phone 14 and the first phone 12;
  if the corresponding (associated) signed second user presence response includes a valid second phone 14 signature; and
  if the signed first presence response includes a valid first phone 12 signature.

It is to be noticed that the distance may be calculated or determined by the SV 110 in different ways by using different technologies, such as (but not limited to):
  an identification of a communication network(s) that is(are) only available in one and the same location;
  a passing of a shared secret between a (selected) second device and the first device in a "Mesh network" by using a distance limited communication protocol, such as a Wi-Fi Direct, Bluetooth or BLE;
  internal gyro recording first and second devices that perform one and the same movement, because the first and second devices are held together by one and the same person, like e.g., the corresponding second user;
  a capture of same biometric data from a biometric sensor relating to the first device and from a biometric sensor relating to the second device;
  a capture of the first user biometric data by a biometric sensor relating to the first device and by a biometric sensor relating to the second device;
  a capture of the second user biometric data by a biometric sensor relating to the first device and by a biometric sensor relating to the second device; and
  a GPS location.

The SV 110 forbids, if the received presence response(s) include(s) the positive presence response and the condition(s) to be satisfied is(are) not satisfied, the first phone 12 to access the requested data and/or service(s). In such a negative case, the SV 110 may send to the first phone 12 a refusal message 234 that includes a refusal to access the requested data and/or service(s).

Otherwise, i.e. only if the received presence response(s) include(s) the positive presence response and the condition(s) to be satisfied is(are) satisfied, the SV 110 authorizes the first phone 12 to access the requested data and/or service(s). In such a positive case, the SV 110 may send to the first phone 12 an authorization message 236 that includes an authorization to access the requested data and/or service(s).

The invention solution allows carrying out a first user location operation by involving one or several second device users, so as to validate (or not) that the first user is (geographically) close to the concerned second user(s) who has(have) (or has(have) not) confirmed a co-location relating to the first user.

The invention claimed is:

1. A method for accessing data or at least one service from a first device relating to a first user, a set of at least one identifier relating each to a second device being predefined, each of the at least one second device being related to a second user, each second device identifier allowing to access the concerned second device, comprising:
  a) receiving, by a server, from the first device, a request for accessing the data or the at least one service from a current location relating to the first user;
  b) sending, from the server, to at least one selected second device, a request to determine whether the first user is or is not locally present, the at least one selected second device being identified within the second device identifier set;
  c) requesting, from each of the at least one selected second device to the second device user, whether the first user is or is not locally present, as a presence request;
  d) getting, from the second user to each of the at least one selected second device, a presence response to the presence request;
  e) sending, from each of the at least one selected second device to the server, the presence response;

f) verifying, by the server, whether the received at least one presence response does or does not include a predefined positive presence response; and g) authorizing, by the server, only if at least one of the received at least one presence response includes the positive presence response, the first device to access the data or the at least one service.

2. Method according to claim 1, wherein the second device retrieves a current second device location and sends, to the server, the current second device location along with the at least one presence response.

3. Method according to claim 1, wherein the steps b), e), f) and g) are replaced by the following steps ba), ea), fa) and ga) respectively:

ba) generating, by a server, a presence challenge and sending, from the server, to at least one selected second device, a request to determine whether the first user is or is not locally present along with the presence challenge, the at least one selected second device being identified within the second device identifier set;

ea) sending, from each of the at least one selected second device to the first device, the presence challenge, and receiving, by the at least one selected second device, from the first device, a response to the presence challenge, as a presence challenge response;

fa) verifying, by the server, whether each of the received at least one presence response does or does not include a predefined positive presence response and whether the received at least one presence challenge response is or is not at least one predefined expected presence challenge response; and ga) authorizing, by the server, only if at least one of the received at least one presence response includes the positive presence response and if the corresponding at least one of the received at least one presence challenge response is the at least one expected presence challenge response, the first device to access the data or the at least one service.

4. Method according to claim 1, wherein the server determines a distance separating the first device and each of the at least one selected second device that sends the positive presence response, and the server verifies whether the at least one distance is or is not less than or equal to a predetermined threshold and authorizes, only if at least one of the at least one distance is less than or equal to the threshold, the first device to access the data or the at least one service.

5. Method according to claim 1, wherein the step d) is replaced by the following step db):

getting, from the second user to each of the at least one selected second device, a presence response to the presence request;

sending, from the at least one second device to the first device, a request for getting a current location relating to the first device;

retrieving, by the first device, a current first device location; and sending, from the first device to the at least one second device, the current first device location.

6. Method according to claim 5, wherein the second device retrieves a current second device location and sends, to the server, the current second device location along with the at least one presence response, and wherein the steps f) and g) are replaced by the following steps fc) and gc) respectively:

fc) verifying, by the server, whether the received at least one presence response does or does not include a predefined positive presence response and whether the received current first device location does or does not match the corresponding received at least one current second device location;

gc) authorizing, by the server, only if at least one of the received at least one presence response includes the positive presence response and if the received current first device location matches the corresponding received at least one current second device location, the first device to access the data or the at least one service.

7. Method according to claim 1, wherein the steps d), e), f) and g) are replaced by the following steps dd), ed), fd) and gd) respectively:

dd) getting, from the second user to each of the at least one selected second device, a second user presence response to the presence request, storing, by each of the at least one selected second device, the second user presence response, sending, from the at least one second device to the first device, a request for getting a signed first device location response, retrieving, by the first device, a current first device location, signing, by the first device, the first device location response, as a signed first presence response, and sending, from the first device to the at least one second device, the signed first presence response;

ed) generating, by each of the at least one selected second device, a signed second user presence response, the signed second user presence response including the second user presence response signed by the second device and the first presence response signed by the first device and the second device, and sending, from each of the at least one selected second device to the server, the signed second user presence response;

fd) verifying, by the server, whether each of the at least one received signed second user presence response does or does not include a predefined positive presence response, whether the twice signed first presence response does or does not prove an origin of the signed first presence response from the first device and through the second device, and whether each of the at least one received signed second user presence response does or does not prove an origin of the signed second user presence response from the second device; and gd) authorizing, by the server, only if at least one of the at least one received signed second user presence response includes the positive presence response and if the corresponding received at least one signed second user presence response proves an origin of the second user presence response from the second device and if the twice signed first presence response proves an origin of the signed first presence response from the first device and through the second device, the first device to access the data or the at least one service.

8. A server for accessing data or at least one service from a first device relating to a first user, wherein, a set of at least one identifier relating each to a second device being predefined, each of the at least one second device being related to a second user, each second device identifier allowing to access the concerned second device, the server is configured to:

receive, from the first device, a request for accessing the data or the at least one service from a current location relating to the first user;

send, to at least one selected second device, a request to determine whether the first user is or is not locally present, the at least one selected second device being identified within the second device identifier set;

receive, from the at least one selected second device, at least one presence response;

verify whether the received at least one presence response does or does not include a predefined positive presence response; and authorize, only if at least one of the received at least one presence response includes the positive presence response, the first device to access the data or the at least one service.

9. A second device for accessing data or at least one service from a first device relating to a first user, wherein the second device is configured to:

receive, from a server, a request to determine whether the first user is or is not locally present;

request, to the second device user, whether the first user is or is not locally present, as a presence request;

get, from the second device user, a presence response to the presence request; and send, to the server, the presence response.

10. A system for accessing data or at least one service from a first device relating to a first user, wherein, a set of at least one identifier relating each to a second device being predefined, each of the at least one second device being related to a second user, each second device identifier allowing to access the concerned second device, the system comprises the first device, at least one selected second device and a server, wherein the first device is configured to send to a server a request for accessing the data or the at least one service from a current location relating to the first user;

wherein the server is configured to send, to at least one selected second device, a request to determine whether the first user is or is not locally present, the at least one selected second device being identified within the second device identifier set;

wherein each of at least one selected second device is configured to:

request, to the second device user, whether the first user is or is not locally present, as a presence request;

get, from the second device user, a presence response to the presence request; and send, to the server, the presence response;

wherein the server is configured to:

receive, from the at least one selected second device, the at least one presence response;

verify whether the received at least one presence response does or does not include a predefined positive presence response; and authorize, only if at least one of the received at least one presence response includes the positive presence response, the first device to access the data or the at least one service.

* * * * *